(No Model.) 2 Sheets—Sheet 1.
J. B. CORNWALL.
COMBINED CORN SHELLER AND CLEANER.
No. 572,084. Patented Nov. 24, 1896.
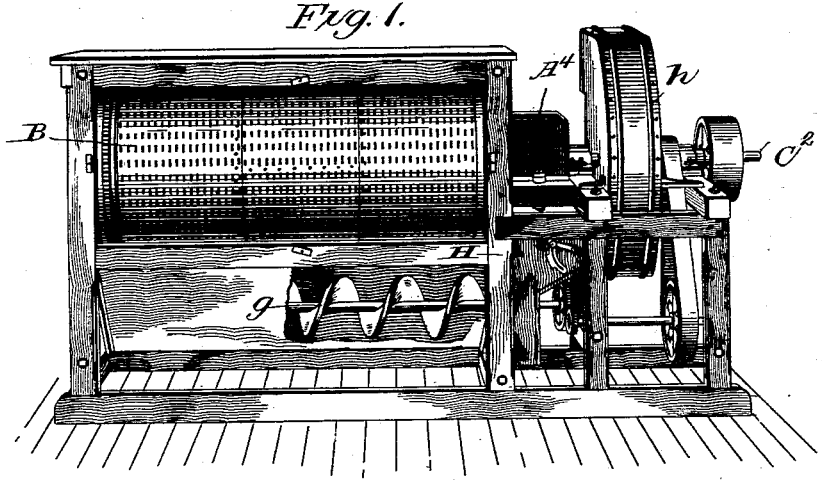
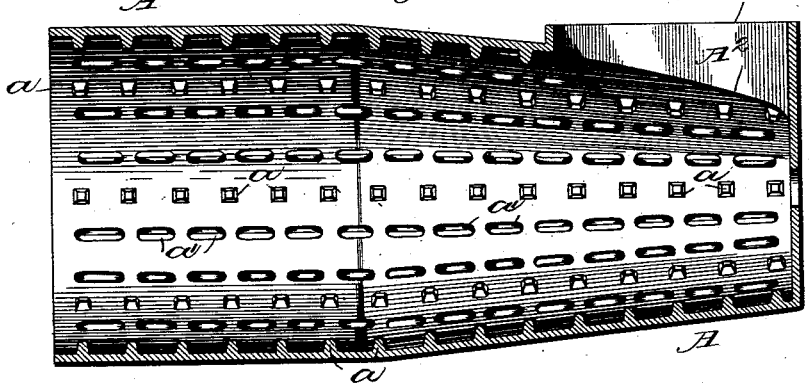
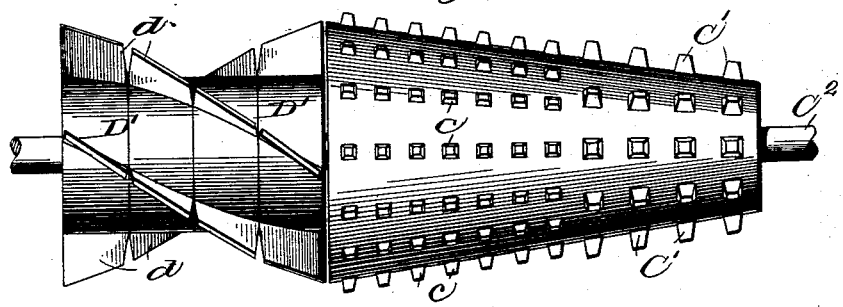
WITNESSES
Jos. C. Stack
James R. Mansfield
INVENTOR
John B Cornwall
By: Alexander A Dowell
Attorneys
THE NORRIS PETERS CO., PHOTO-LITHO., WASHINGTON, D. C.

(No Model.) 2 Sheets—Sheet 2.
J. B. CORNWALL.
COMBINED CORN SHELLER AND CLEANER.
No. 572,084. Patented Nov. 24, 1896.
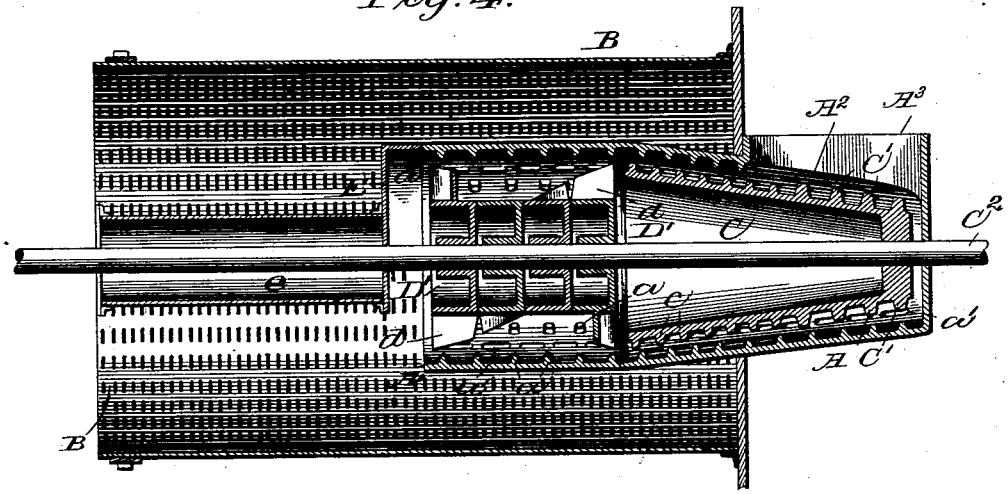
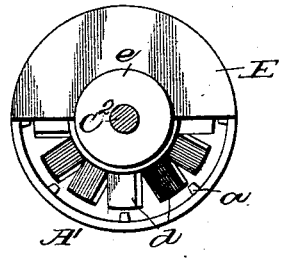
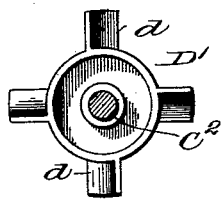
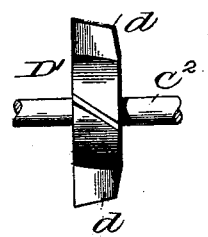

UNITED STATES PATENT OFFICE.

JOHN B. CORNWALL, OF MOLINE, ILLINOIS.

COMBINED CORN SHELLER AND CLEANER.

SPECIFICATION forming part of Letters Patent No. 572,084, dated November 24, 1896.

Application filed July 30, 1896. Serial No. 601,038. (No model.)

*To all whom it may concern:*

Be it known that I, JOHN B. CORNWALL, of Moline, in the county of Rock Island and State of Illinois, have invented certain new and useful Improvements in a Combined Corn Sheller and Cleaner; and I hereby declare that the following is a full, clear, and exact description thereof, reference being had to the accompanying drawings, which form part of this specification.

This invention is a combined corn husker, sheller, and cleaner, its object being to provide a machine which will shuck the ears, shell the corn, separate the corn from the husks and cobs, and clean the corn fit for market.

The invention consists in the novel construction and combination of parts summarized in the claims, illustrated in the accompanying drawings, and described as follows, referring to said drawings as part of this application by letters of reference.

Figure 1 is a perspective view of the machine partly broken open. Fig. 2 is an enlarged vertical longitudinal section through the hopper and shell or the stationary part of the shelling and husking devices. Fig. 3 is a side elevation of the shelling-cone and beater, which work within the shell. Fig. 4 is a detail longitudinal section of the machine, showing the revolving screen, the stationary hopper and shell, the rotary shelling-cone and beaters, also the hood attached to the end of the shell, and the tubular guard attached to the hood and surrounding the shaft within the rotary screen. Fig. 5 is an end view of the hood and guard as attached to the end of the shelling-case. Figs. 7 and 6 are end and side views of one of the beaters detached.

This machine is an improvement on the combined corn sheller and cleaner patented by Heman A. Barnard April 19, 1881, No. 240,362. The peculiarity of the shell consists in having in both its upper and lower parts openings for the escape of the corn, and it is extended rearward to inclose the separating-beaters, so that the shelled corn may be separated from the shucks by power instead of by gravity. The shell is tapering and projects outside of the revolving screen the entire length of the feed-hopper. The shelling-cone extends practically the whole length of the shelling-case, thus dispensing with beaters or breakers under the hopper. It has short projections arranged in a spiral form at the front part of it under the hopper, which convey the corn cobs and husks into the interior of the shell. The shell-case is extended beyond the shelling-cone to inclose the separating-beaters, thus forming a chamber into which the shucks, cobs, &c., are discharged from the sheller, and the remaining corn is separated from them by the action of the beaters. The beaters perform the double office of separating the corn from the shucks and cob and discharging them from the sheller.

Referring to the drawings, the shell has a portion A, which is a frustum of a hollow cone, closed at its smaller end, and at the larger end of part A is a cylindrical extension A'. In the upper part of portion A and extending from its small end inward about half its length is a slot $A^2$, which is surrounded by a vertical flange $A^3$, and this part of the shell I call the "hopper," because it answers the purpose of a hopper, but for convenience it is fitted under an enlarged feed-box $A^4$, as shown.

The shell throughout has longitudinal rows of inwardly-projecting studs $a$ on its inner surface, and between each row of studs are two rows of perforations or slots $a'$ for the escape of the grain. This shell is fixedly supported in the machine in any suitable manner, and all that part of the shell from the inner end of the hopper to the end of part A' is inclosed in a rotary screen B, which may be constructed and operated like the screen E in Barnard's patent referred to, or in other suitable manner.

$C^2$ designates a shaft extending axially through the shell, and thereon is mounted the husking and shelling iron or cone C, which occupies substantially the whole interior of part A of the shell and has a spiral row of teeth C' on its smaller end, under the hopper, which not only assist in the husking and shelling operations, but feed the husks, corn, &c., down into and through the shell.

The larger part of the cone to the inside of the hopper has smaller teeth $c$, adapted to coöperate with the teeth on the interior of the shell to complete the husking and shelling operations.

After passing cone C the husks and corn are subjected to the action of the beater D within part A' of the shell. This beater is preferably made up of cylindrical sections D', which are strung on shaft $C^2$, and each provided with a series of diagonally-arranged wings or blades $d$, and the several sections are so secured on the shaft that the blades $d$ form large spirals which assist in forcing the husks, &c., out of the shell.

Attached to the rear end of the shell A, over shaft $C^2$, is a semicircular hood E, which supports the inner end of a sleeve $e$, surrounding the exposed portion of shaft $C^2$ within screen B, to prevent shucks, fodder, &c., from winding upon the shaft.

G designates a hopper below screen B, within which is a worm conveyer $g$. H is an air-trunk, and $h$ an exhaust-fan casing, these parts being operated and arranged substantially as in the Barnard patent referred to.

In operation the unhusked corn is fed into the hopper and is caught by the teeth C' and carried around and inward, the husks being stripped by abrasion between the teeth C' $c$ on the cone and teeth $a$ on the shell. The shelled corn is flung out of the casing on all sides by centrifugal action, through the numerous openings $a'$ in the shell, and the mass of husks, cobs, and remaining corn fall from the cone onto the beater D, which is of sufficiently large diameter to prevent the husks, &c., wrapping thereon, and the blades $d$ beat the corn out of the husks and fling it out through openings $a'$.

The corn, cobs, husks, &c., pass into the rotary screen and the grain is separated from the other matters in the usual manner, the husks and cobs passing off at the tail end of the machine and the corn passing through the screen into the conveyer-chamber, from which it is carried to the separating-trunk, where the dust and light impurities which may pass into the conveyer-chamber with the corn are drawn off by the air-blast.

Having thus described my invention, what I therefore claim as new, and desire to secure by Letters Patent thereon, is—

1. In a corn husker, sheller and cleaner, a conical sheller-casing having a parallel extension at its large end extending beyond the shelling-cone forming a chamber, and a sleeve attached to said chamber, in combination with a rotatable shaft extending axially through the shell, chamber and sleeve, having a conical shelling-cone and beater-drum mounted thereon; whereby the husks passing through the sheller are prevented from wrapping around said shaft and clogging the sheller, substantially as and for the purpose described.

2. In a corn-sheller a conical sheller-casing having a parallel extension at its large end extending beyond the shelling-cone forming a chamber; in combination with the conical shelling-cone and sectional beater-drum revolving therein, substantially as and for the purpose described.

3. The combination of the rotary screen, a fixed shell therein having a conical end extending through one end of the screen, and provided with a hopper exterior to the screen; and with internal teeth substantially as described; with the rotatable shaft extending axially through the shell, a shelling-cone fixed on said shaft within the conical portion of the shell having spiral teeth beneath the hopper, and also toothed on its interior portion; and the beater on the shaft within the inner end of the shell, all substantially as and for the purpose described.

4. The combination of the casing, the rotatable screen; the rotatable shaft passing axially therethrough; the fixed shell having its outer end conical and projecting through the end of the screen and provided with a hopper; said shell having rows of internally-projecting teeth, and rows of perforations intermediate the rows of teeth substantially as described; with the shelling-cone mounted on the shaft, within the conical portion of the casing, having spiral teeth C, and husking-teeth $c$; and the beater-sections mounted on the shaft within the cylindrical portion of the shell; all for the purpose and substantially as described.

In testimony that I claim the foregoing as my own I affix my signature in presence of two witnesses.

JOHN B. CORNWALL.

In presence of—
 CHAS. W. LUNDAHL,
 CHAS. S. KERNS.